US012621419B2

(12) United States Patent
Paglia et al.

(10) Patent No.: US 12,621,419 B2
(45) Date of Patent: May 5, 2026

(54) SYSTEMS AND METHODS FOR GENERATING VIDEO BASED ON INFORMATIONAL AUDIO DATA

(71) Applicant: Musixmatch S.P.A., Bologna (IT)

(72) Inventors: Marco Paglia, Bologna (IT); Alessandro Camedda, Bologna (IT); Davide Soranzio, Bologna (IT)

(73) Assignee: Musixmatch S.P.A., Bologna (IT)

( * ) Notice: Subject to any disclaimer, the term of this patent is extended or adjusted under 35 U.S.C. 154(b) by 0 days.

(21) Appl. No.: 18/736,794

(22) Filed: Jun. 7, 2024

(65) Prior Publication Data

US 2024/0414291 A1 Dec. 12, 2024

Related U.S. Application Data

(60) Provisional application No. 63/506,946, filed on Jun. 8, 2023.

(51) Int. Cl.
H04N 9/87 (2006.01)
G11B 27/036 (2006.01)

(52) U.S. Cl.
CPC ......... H04N 9/8715 (2013.01); G11B 27/036 (2013.01)

(58) Field of Classification Search
CPC ........................... H04N 9/8715; G11B 27/036
See application file for complete search history.

(56) References Cited

U.S. PATENT DOCUMENTS

2022/0076706 A1* 3/2022 Walker .................. G06F 3/0482
2024/0013518 A1* 1/2024 Hamilton ............. G06V 10/774
2024/0135973 A1* 4/2024 Bai ....................... G11B 27/031

* cited by examiner

*Primary Examiner* — Mishawn N. Hunter
(74) *Attorney, Agent, or Firm* — Dickinson Wright PLLC; Jonathan H. Harder

(57) ABSTRACT

In one embodiment, a computer-implemented method may include receiving a media file, extracting, using an artificial intelligence engine including one or more trained machine learning models, one or more audio features from the media file. The one or more audio features include at least one of a time-synchronized transcript, speaker recognition data, mood data, index data, visual asset speaker data, color palette data, and written description speaker data. The method may include generating, based on the one or more audio features, a video, wherein the video is presented via a media player on a user interface of a computing device.

17 Claims, 9 Drawing Sheets

10

Cloud-Based Computing System
116

Server
128

Database
129

Training Engine
152

Machine Learning
Model(s)
154

Network
20

Computing Device 12

User Interface
160

200

AT A PROCESSING DEVICE

RECEIVE AN AUDIO FILE 202

EXTRACT, USING AN ARTIFICIAL INTELLIGENCE ENGINE INCLUDING ONE OR MORE TRAINED MACHINE LEARNING MODELS, ONE OR MORE AUDIO FEATURES FROM THE AUDIO FILE 204

GENERATE, BASED ON THE ONE OR MORE AUDIO FEATURES, A VIDEO, WHEREIN THE VIDEO IS PRESENTED VIA A MEDIA PLAYER ON A USER INTERFACE OF A COMPUTING DEVICE 206

SYSTEMS AND METHODS FOR GENERATING VIDEO BASED ON INFORMATIONAL AUDIO DATA

CROSS-REFERENCE TO RELATED APPLICATION AND CLAIM OF PRIORITY

This application claims priority under 35 U.S.C. § 119(e) to U.S. Provisional Patent Application No. 63/506,946 filed on Jun. 8, 2023 titled "SYSTEMS AND METHODS FOR GENERATING VIDEO BASED ON INFORMATIONAL AUDIO DATA." The above-identified provisional patent application is hereby incorporated by reference in its entirety.

TECHNICAL FIELD

This disclosure relates to content. More specifically, this disclosure relates to systems and methods for generating video based on informational audio data.

BACKGROUND

Content items (e.g., songs, movies, videos, podcasts, transcriptions, etc.) are conventionally played via a computing device, such as a smartphone, laptop, desktop, television, or the like.

SUMMARY

In one embodiment, a computer-implemented method may include receiving an audio file, extracting, using an artificial intelligence engine including one or more trained machine learning models, one or more audio features from the audio file. The one or more audio features include at least one of a time-synchronized transcript, speaker recognition data, mood data, index data, visual asset speaker data, color palette data, and written description speaker data. The method may include generating, based on the one or more audio features, a video, wherein the video is presented via a media player on a user interface of a computing device.

In one embodiment, a tangible, non-transitory computer-readable medium stores instructions that, when executed, cause a processing device to perform any operation of any method disclosed herein.

In one embodiment, a system includes a memory device storing instructions and a processing device communicatively coupled to the memory device. The processing device executes the instructions to perform any operation of any method disclosed herein.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which.

NOTATION AND NOMENCLATURE

Figure 1:
FIG. 1 illustrates a system architecture according to certain embodiments of this disclosure.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more"

when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The terms "graph network" and "graph neural network" may be used interchangeably herein.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIGS. 1 through 8, discussed below, and the various embodiments used to describe the principles of this disclosure in this patent document are by way of illustration only and should not be construed in any way to limit the scope of the disclosure.

Content item (e.g., music, movies, shows, books, podcasts, video games, papers, websites, etc.) creation and/or generation may be a technically challenging problem. Audio files may include a format that is difficult to visualize. Conventional techniques may include visualizing the audio as a soundwave, which may provide a purely visual representation. However, audio is a valuable medium that includes a multitude of information. Within an informational space, abstract visualization of audio leaves much to be desired.

To that end, the present disclosure provides a technical solution. For example, some embodiments may enable automatically extracting information from an audio file (e.g., podcast, song, etc.) and automatically generating a customized video that visually represents the information included in the audio file. Some embodiments may analyze the audio to obtain desired datasets. For example, time-synchronized transcription of content of the audio file may be obtained using the disclosed techniques. Some embodiments may analyze the mood of speech included within the transcription. Some embodiments may segment speakers (e.g., speaker 1, speaker 2, etc.) who speak in the transcription. Some embodiments may perform speaker recognition (e.g. identify who the actual speakers are) and assign visual assets to the speakers and assign written description of the speakers. Additionally, some embodiments, may perform entity recognition (e.g., identify topics, brands, companies, etc.) and assign visual assets to the entities and assign written description to the entities. Some embodiments may generate chapters of the audio including short descriptions of the chapters. Some embodiments may identify the most relevant segments of the audio across chapters. For podcasts, some embodiments may index the episode (e.g., the audio is the N episode of the X show). For podcasts, some embodiments may analyze existing visual assets (e.g., cover art, font, etc.). Once the datasets have been extracted, some embodiments may execute an artificial intelligence engine (e.g., visualization system) to generate a video that is personalized to the specific audio and that includes the relevant information, which may enhance the user's visual experience, among other things. The video may be shareable via one or more social media platforms (e.g., Facebook®, Instagram®, etc.). For example, the video may be posted in a social media post and/or transmitted attached in a message on the social media platforms. In some embodiments, the video may include a representation of time-synchronized spoken word, a graphical representation of the context of the audio (e.g., pictures of the two speakers), a representation of one or more entities (e.g., a book, a movie, a product, clothing, etc.) discussed in the audio, written description associated with one or more speakers and/or entities, or some combination thereof.

Turning now to the figures, FIG. 1 depicts a system architecture 10 according to some embodiments. The system architecture 10 may include one or more computing devices 12 of one or more users communicatively coupled to a cloud-based computing system 116. Each of the computing devices 12 and components included in the cloud-based computing system 116 may include one or more processing devices, memory devices, and/or network interface cards. The network interface cards may enable communication via a wireless protocol for transmitting data over short distances, such as Bluetooth, ZigBee, NFC, etc. Additionally, the network interface cards may enable communicating data over long distances, and in one example, the computing devices 12 and the cloud-based computing system 116 may communicate with a network 20. Network 20 may be a public network (e.g., connected to the Internet via wired (Ethernet) or wireless (WiFi)), a private network (e.g., a local area network (LAN) or wide area network (WAN)), or a combination thereof. Network 20 may also comprise a node or nodes on the Internet of Things (IoT).

The computing devices 12 may be any suitable computing device, such as a laptop, tablet, smartphone, or computer. The computing devices 12 may include a display capable of presenting a user interface 160 of an application. The application may be implemented in computer instructions stored on the one or more memory devices of the computing devices 12 and executable by the one or more processing devices of the computing device 12. The application may present various screens to a user. For example, the user interface 160 may present a screen that includes a media player that presents a video generated using the disclosed embodiments.

In some embodiments, the user interface 160 is executed by an application that is a stand-alone application installed and executing on the computing devices. In some embodiments, the application (e.g., website) executes within another application (e.g., web browser). The computing device 12 may also include instructions stored on the one or more memory devices that, when executed by the one or more processing devices of the computing devices 12 perform operations of any of the methods described herein.

In some embodiments, the cloud-based computing system 116 may include one or more servers 128 that form a distributed computing architecture. The servers 128 may be a rackmount server, a router computer, a personal computer, a portable digital assistant, a mobile phone, a laptop computer, a tablet computer, a camera, a video camera, a netbook, a desktop computer, a media center, any other device capable of functioning as a server, or any combination of the above. Each of the servers 128 may include one or more processing devices, memory devices, data storage, and/or network interface cards. The servers 128 may be in communication with one another via any suitable communication protocol. The servers 128 may execute an artificial intelligence (AI) engine that uses one or more machine learning models 154 to perform at least one of the embodiments disclosed herein. The cloud-based computing system 116 may also include a database 129 that stores data, knowledge, and data structures used to perform various embodiments. For example, the database 129 may store content items, time-synchronized text, tags and their association with the time-synchronized text, user profiles, customized content items, customized videos, images, lyrics, audio, user profiles, etc. In some embodiments, the database 129 may be hosted on one or more of the servers 128.

In some embodiments the cloud-based computing system 116 may include a training engine 152 capable of generating the one or more machine learning models 154. The machine learning models 154 may be trained to receive a media file (e.g., audio file) and to perform audio feature extraction and/or video generation, among other things. The one or more machine learning models 154 may be generated by the training engine 152 and may be implemented in computer instructions executable by one or more processing devices of the training engine 152 and/or the servers 128. To generate the one or more machine learning models 154, the training engine 152 may train the one or more machine learning models 154 (e.g., using training data).

The training engine 152 may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine 152 may be cloud-based, be a real-time software platform, include privacy software or protocols, and/or include security software or protocols.

To generate the one or more machine learning models 154, the training engine 152 may train the one or more machine learning models 154. The training engine 152 may use a base data set of audio, text, instrument audio signatures, stem audio signatures, semantic mood signatures, keywords, or some combination thereof.

The one or more machine learning models 154 may refer to model artifacts created by the training engine 152 using training data that includes training inputs and corresponding target outputs. The training engine 152 may find patterns in the training data wherein such patterns map the training input to the target output and generate the machine learning models 154 that capture these patterns. For example, the machine learning model may receive a song file and identify audio and/or text features to be used to customize a content item based on a selected template and may generate a customized video as output. In some embodiments, the training data may include labeled inputs (e.g., lyrics, audio features, text features, identified mood, etc.) mapped to labeled outputs (e.g., video features to include such as visuals, sounds, graphics, information, sequence information, etc.) Although depicted separately from the server 128, in some embodiments, the training engine 152 may reside on server 128. Further, in some embodiments, the database 129, and/or the training engine 152 may reside on the computing devices 12.

As described in more detail below, the one or more machine learning models 154 may comprise, e.g., a single level of linear or non-linear operations (e.g., a support vector machine [SVM]) or the machine learning models 154 may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons.

Figure 2:
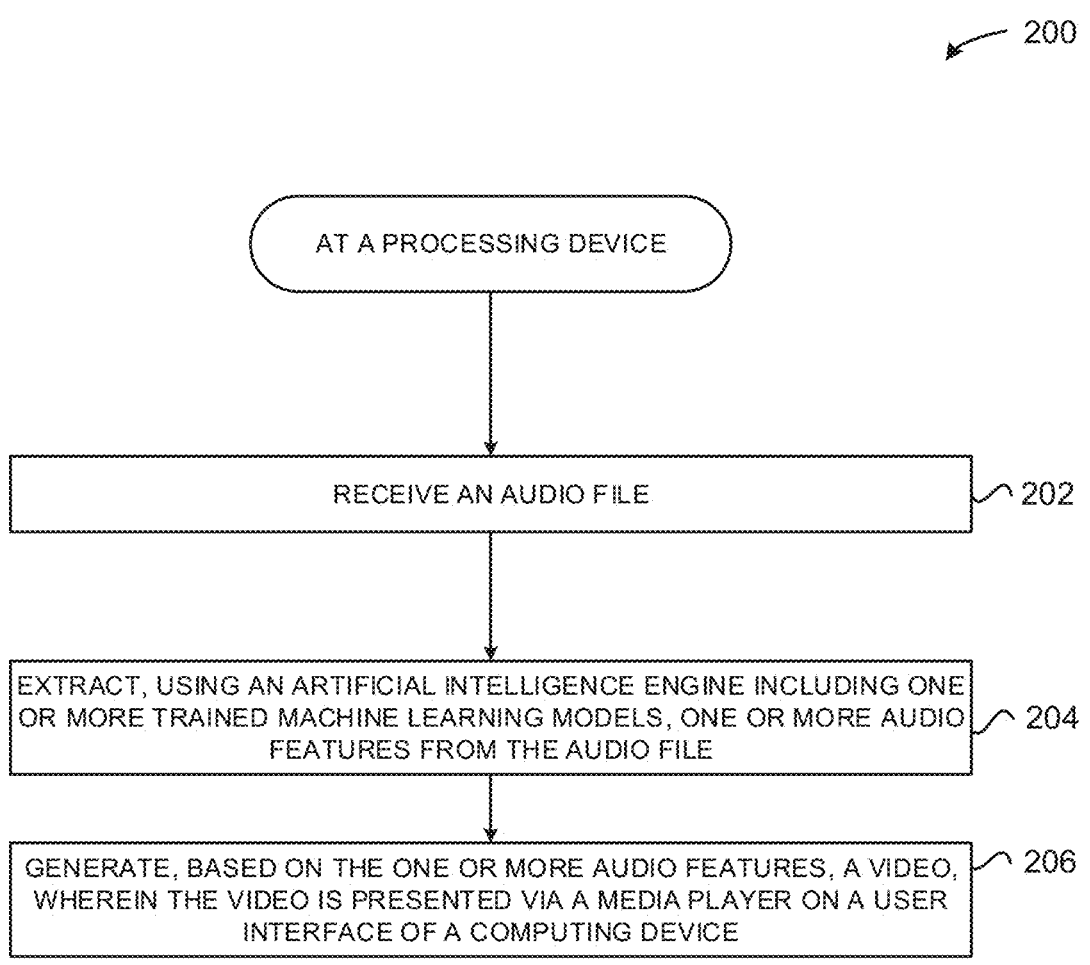
FIG. 2 illustrates an example of a method for generating a customized video based on at least audio features extracted from an audio file according to certain embodiments of this disclosure.

FIG. 2 illustrates an example of a method 200 for generating a customized video based on at least audio features extracted from an audio according to certain embodiments of this disclosure. The method 200 may be performed by processing logic that may include hardware (circuitry, dedicated logic, etc.), software, or a combination of both. The method 200 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 200. The method 200 may be implemented as computer instructions stored on a memory device and executable by the one or more processors. In certain implementations, the method 200 may be performed by a single processing thread. Alternatively, the method 200 may be performed by two or more processing threads, each thread implementing one or more individual functions, routines, subroutines, or operations of the methods.

At block 202, the processing device may receive a media file (e.g., audio, video, etc.). The audio file may be received from any suitable source, such as a website, server, computer, etc. For example, the audio file may be recorded using a computing device and uploaded and/or shared from that computing device.

At block 204, the processing device may extract, using an artificial intelligence engine including one or more trained machine learning models, one or more audio features from the media file. In some embodiments, the processing device may extract one or more audio features from the audio file. The one or more audio features may include at least one of a time-synchronized transcript, speaker recognition data, mood data, index data, visual asset speaker data, color palette data, and written description speaker data. In some embodiments, the visual asset speaker data is obtained by identifying the speaker and querying information (e.g., images) associated with the speaker from a data source. In some embodiments, the written description speaker data is obtained by identifying the speaker and querying information (e.g., written description) associated with the speaker from a data source. In some embodiments, the speaker may be identified by performing voice signature recognition based on characteristics of voices. That is, in some embodiments, predetermined characteristics of voices may be analyzed against the voices present in the media file to identify the speakers.

At block 206, the processing device may generate, based on the one or more audio features, a video. The video may be presented via a media player on a user interface of a computing device 12.

In some embodiments, the processing device may use the visual asset speaker data to assign one or more visual representations of one or more speakers to be presented when the one or more speakers speak during the video. For example, two pictures of two people may be associated with two speakers, and the two pictures may be displayed concurrently such that one picture is zoomed in when one of the speakers is talking and the other picture is zoomed in when the second speaker is talking.

In some embodiments, the processing device may cause the time-synchronized transcript to be dynamically presented in conjunction with the one or more visual representations of the one or more speakers during playback of the video.

In some embodiments, the processing device may modify, based on the mood data, a visual representation of speech of a speaker during playback of the video. For example, the visual representation may change colors based on the mood (e.g., a color may change to red if the mood is mad, green if the mood is happy, and the like). The visual representation may be morphed to change shapes based on the mood.

In some embodiments, the processing device may modify, based on the written description speaker data, presented text in the video during playback of the video. For example, information about the speaker may be presented as text in the video during playback of the video (e.g., the information may relate to biographical data of the speaker, interests of the speaker, content made by the speaker, links to the content made by the speaker, and the like).

In some embodiments, the processing device may identify, based on the time-synchronized transcription, an entity (e.g., a company, a product, a person, an animal, a service, a content item, an occupation, a sport, a vehicle, etc.) associated with a word. The processing device may obtain an image associated with the entity, and the processing device may modify the video to include the image during playback of the video. The processing device may obtain written description data of the entity and modify the video to include the written description data of the entity and the image during playback of the video. The processing device may receive a selection of the image or the written description data of the entity. Responsive to receiving the selection, the processing device may cause additional information pertaining to the entity to be presented via the user interface.

Figure 3:
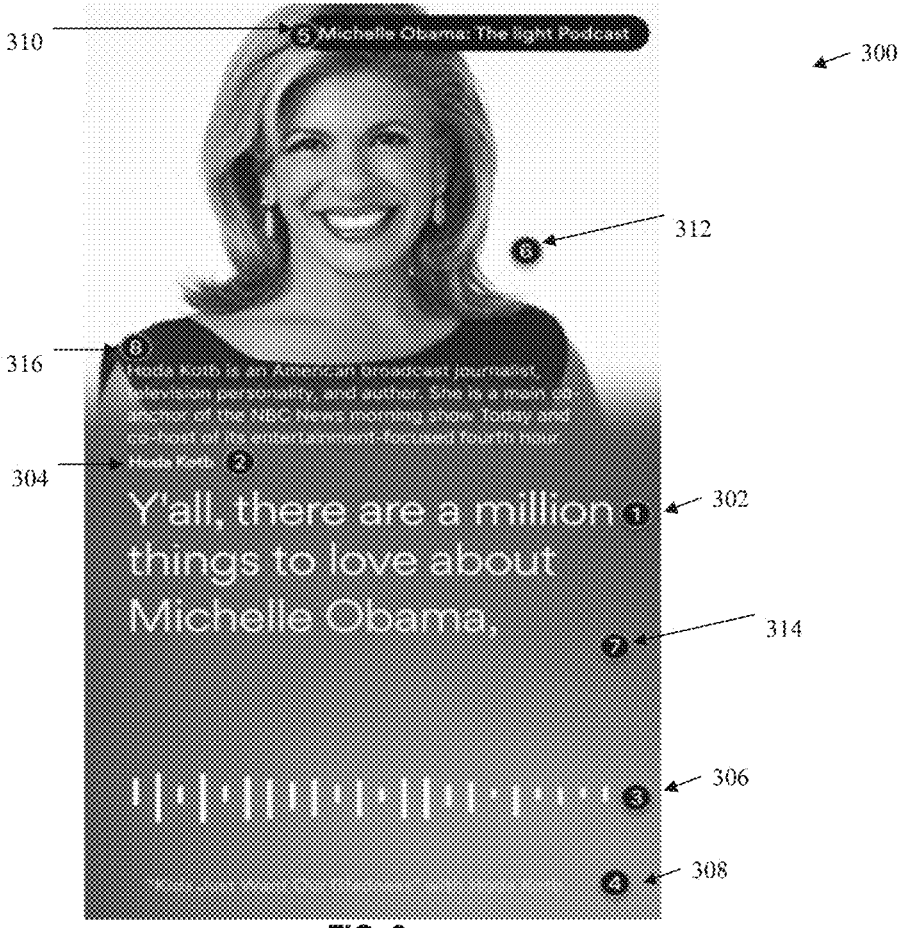
FIG. 3 illustrates an example video generated based on one or more audio features extracted from an audio file according to certain embodiments of this disclosure.

FIG. 3 illustrates an example video 300 generated based on one or more audio features extracted from an audio file according to certain embodiments of this disclosure. As depicted, a time-synchronized transcript 302 is generated and presented in the user interface of the video 300. A current speaker 304 is identified and presented on the user interface. A mood/soundwave 306 is visually represented on the user interface of the video 300. A podcast episode 308 and 310 has been indexed and presented on the user interface of the video 300. A visual asset 312 (e.g., image of the speaker) has been identified and assigned for presentation while the speaker speaks during playback of the video 300. One or more machine learning models may be trained to generate a color palette 314 starting from analysis of existing visual assets (e.g., the assigned image of the speaker). Further, written description speaker data 316 may be generated and/or obtained for presentation on the user interface of the video 300.

The processing device may analyze information included in the audio related to the speaker. For example, the speaker's voice may be detected using a voice database of audio fingerprints associated with speakers. The speaker's name may be associated to an identifier (e.g., online source such as Wikidata), for example. The speaker's image may be extracted from an online source (e.g., Wikidata image category). The written description speaker data may be extracted from the online source (e.g., Wikidata).

The processing device may generate and/or extract the color palette and/or font style of the time-synchronized transcript from an image associated with the audio file. In another embodiment, the color palette and/or font may be extracted from an image associated to the audio (e.g., a radio show).

The episode title may be extracted by the processing device from indexing associated with the audio file (e.g., podcast show). In another example, the episode title may be extracted from another type of indexing associated to the audio (e.g., a radio show).

Figure 4:
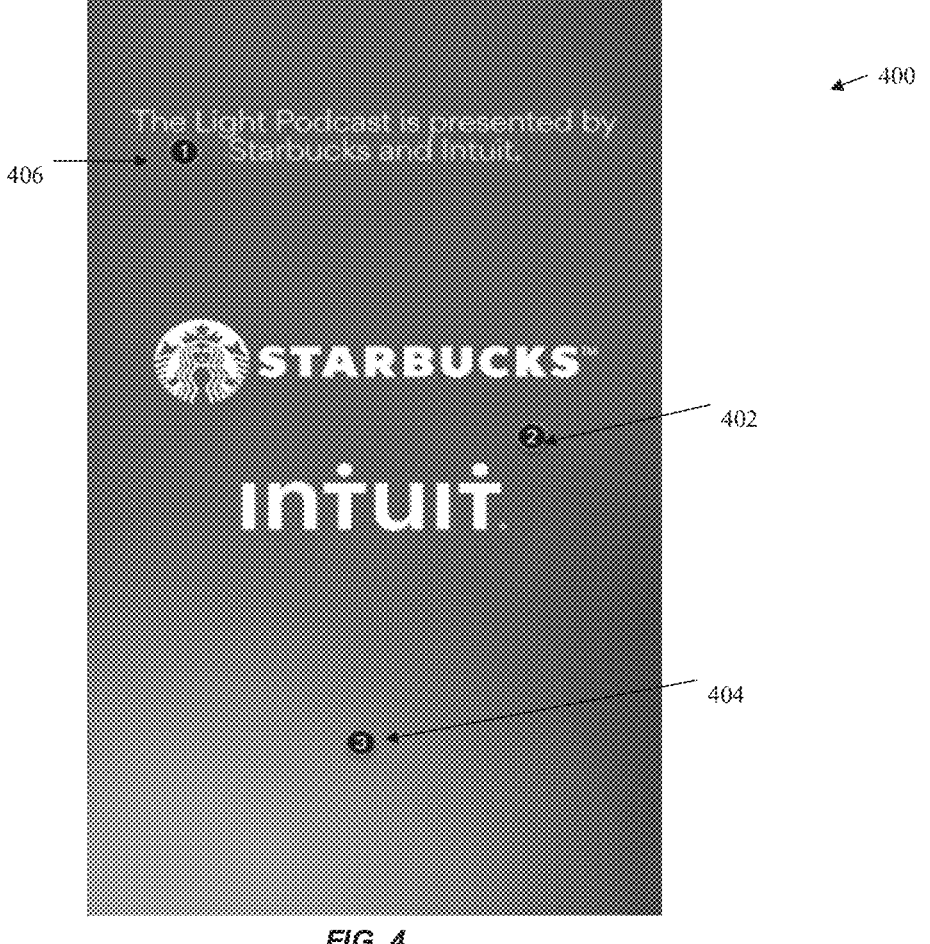
FIG. 4 illustrates another example video generated based on one or more audio features extracted from an audio file according to certain embodiments of this disclosure.

FIG. 4 illustrates another example video 400 generated based on one or more audio features extracted from an audio file according to certain embodiments of this disclosure. The video 400 includes an advertisement. The one or more audio features extracted include time-synchronized transcript 406 that is presented during playback of the video 400. The video 400 also includes entities recognized in the audio features and visual assets associated thereto. The entities may include one or more businesses and the visual assets may include one or logos associated with the businesses. The video 400 also includes a color palette 404 that is generated dynamically based on existing visual assets included in the video 400.

The audio file may be visualized in the video 400 such that the time-synchronized transcript is rendered differently from the video 400, as it is recognized as part of an advertisement. Accordingly, depending on the type of content being represented, the font of the transcript may change. Further, as depicted, logos may be generated by extracting images from various online sources (e.g., Wikidata libraries). The depicted video 400 may enable a user to make a selection from the user interface to learn more information about a depicted entity. For example, the user may select one of the depicted logos to learn more about a sponsor associated with the video 400.

Figure 5:
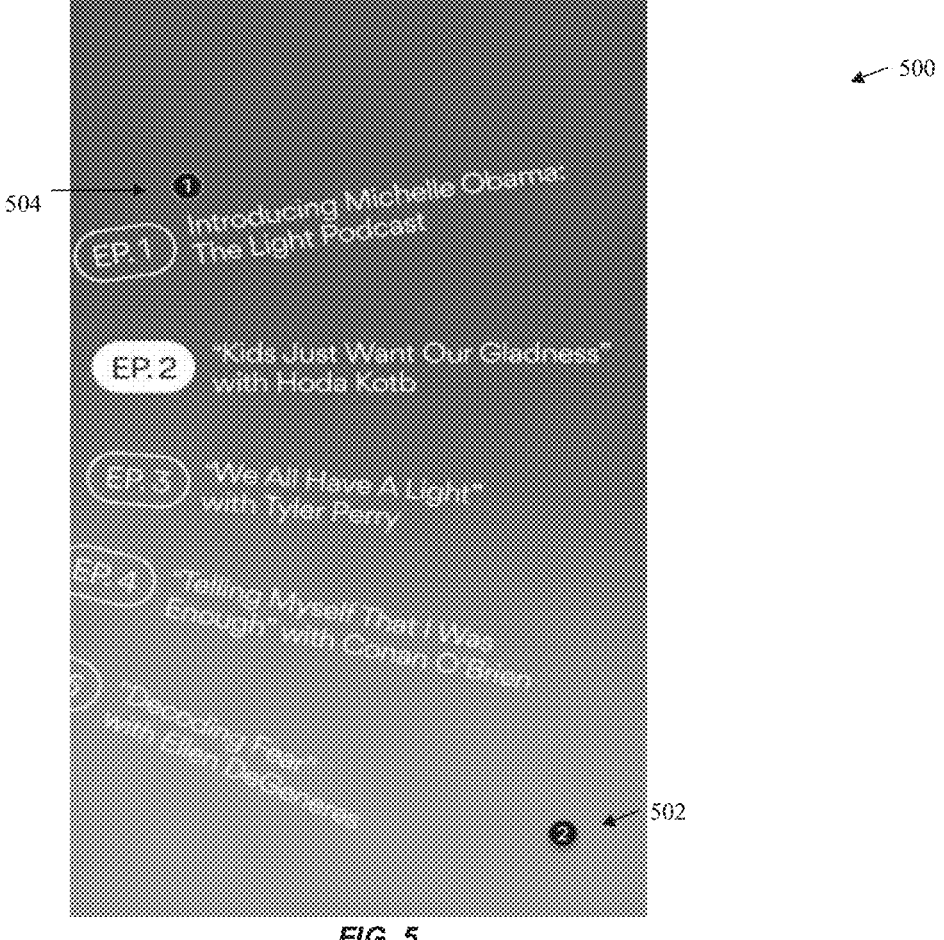
FIG. 5 illustrates another example video generated based on one or more audio features extracted from an audio file according to certain embodiments of this disclosure.

FIG. 5 illustrates another example video 500 generated based on one or more audio features extracted from an audio file according to certain embodiments of this disclosure. The depicted video 500 includes an indexing 504 of the episode. Further, the video 500 includes color palette 502 generated based on the analysis of existing visual assets associated with the one or more audio features.

In some embodiments, visualization may be performed for the episodes within a series, or chapters within an episode. In the depicted video 500, the episode is introduced with a visual representation of where the episode is located in the series. A similar representation may be used to represent in what chapter the user is listening to within an episode.

Further, the video 500 may enable interaction via selection of another episode/chapter to jump to a new video section associated with the selection.

Figure 6:
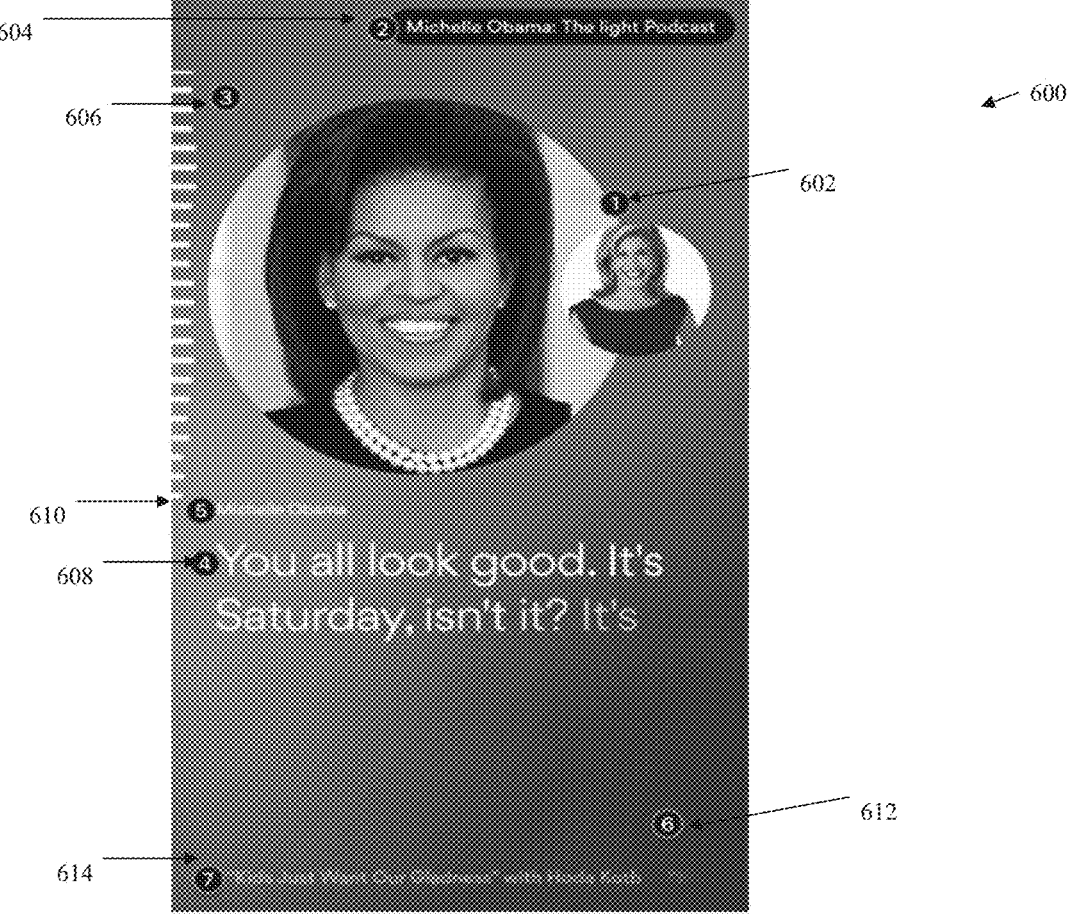
FIG. 6 illustrates another example video generated based on one or more audio features extracted from an audio file according to certain embodiments of this disclosure.

FIG. 6 illustrates another example video 600 generated based on one or more audio features extracted from an audio file according to certain embodiments of this disclosure. The video 600 includes two speakers. However, any suitable number of speakers may be visualized in the video 600. As depicted, the processing device recognized the speakers and assigned visual assets 602 to each speaker. For example, an image of each speaker is presented on the user interface. The image associated with the speaker currently speaking may be actuated (e.g., zoomed in) while the image associated with speaker not speaking may be unactuated (e.g., zoomed out). The video 600 presents an indexing 604 of the title of the video. A mood 606 of the speech of the speaker is represented via a graphical representation. The mood is represented as dashed lines that are modified in size, shape, and/or color depending on the mood. A time-synchronized transcription 608 is presented in the video 600. The current speaker 610 is recognized and presented in conjunction with the visual asset (e.g., image) of the speaker while the speaker is speaking during playback of the video 600. Further, a color palette 612 may be generated based on the analysis of existing visual assets. Also, the audio chapter 614 may be indexed.

Figure 7:
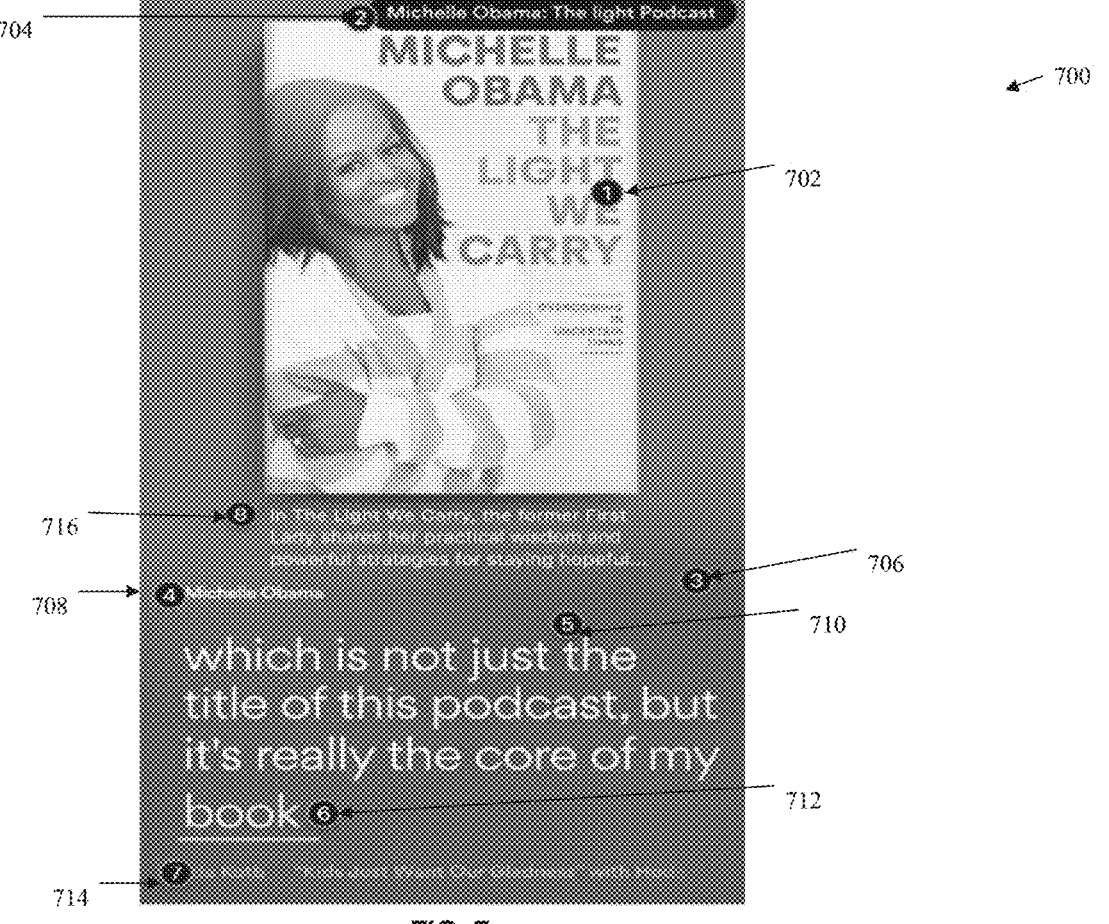
FIG. 7 illustrates another example video generated based on one or more audio features extracted from an audio file according to certain embodiments of this disclosure.

FIG. 7 illustrates another example video 700 generated based on one or more audio features extracted from an audio file according to certain embodiments of this disclosure. As depicted, the time-synchronized transcription 710 includes an entity 712 (e.g., "book") that is recognized by the processing device executing one or more machine learning models. As a result, a visual asset (e.g., image of the book) 702 may be generated and/or extracted from an online source. Further, the video title 704 may be indexed. The mood 706 of the speech of the speaker may be visualized and presented in the user interface of the video 700. The speaker 708 may be recognized and presented in the video 700 during playback. Further, a chapter 714 may be identified and indexed. Also, written description entity data 716 may be generated and/or extracted and presented in the user interface of the video 700.

In some embodiments, the cloud-based computing system 116 may recognize the entity ("book") associated with one of the words inside the transcript, in this case a book written by Michelle Obama, and associated automatically with an image from an online source (e.g., Wikidata including corpus of images). In the depicted example, the image of the entity appears front and center and is presented in conjunction with its written description.

In some embodiments, the video 700 may enable interaction with a user. For example, the user may select the visual asset of the entity to find out more information about the entity and/or purchase the entity, for example. Selecting the visual asset may direct the user interface to another application and/or website to enable purchasing the entity. In some embodiments, a separate window may be opened in the user interface concurrently while the window playing the video continues to play the video.

In some embodiments, video summaries may be generated using the disclosed techniques. For example, these videos may be generated by an analysis of the audio file, which includes a time-synchronized transcript. Transcripts may be automatically analyzed to extract its time-based chapters, with a description. Chapters may be used to produce highlights of an audio file. For instance, an audio of 1 hour may be segmented into 5-6 chapters, and each chapter may have a video associated to it. In addition, the cloud-based computing system 116 may further analyze the chapters to obtain information to create a single video trailer of the audio.

Figure 8:
FIG. 8 illustrates another example video generated based on one or more audio features extracted from an audio file according to certain embodiments of this disclosure.
Figure 8:
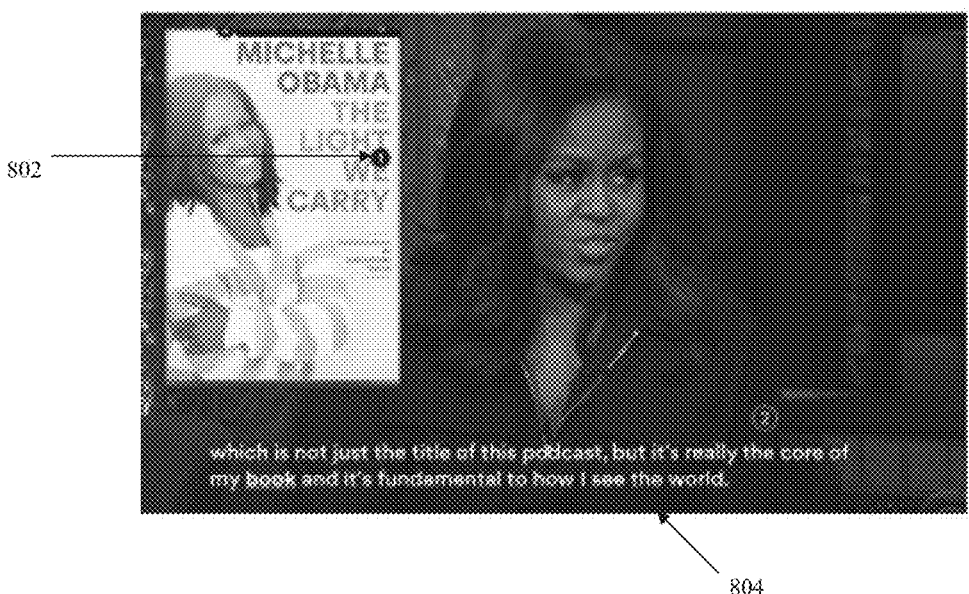

FIG. 8 illustrates another example video 800 generated based on one or more audio features extracted from an audio file according to certain embodiments of this disclosure. In the depicted embodiment, an existing video is overlaid with extracted content from an audio file. For example, an entity ("book") is identified in the time-synchronized transcription 804 and a visual asset 802 for the entity is obtained and overlaid on the existing video during the time the speaker is discussing the entity. In some embodiments, the visual asset may be produced as an interstitial when the speaker is discussing the associated entity. In some embodiments, the information extracted from the audio file may be used to automatically augment the information displayed on an existing video such that a new video 800 is generated with the extracted information.

Figure 9:
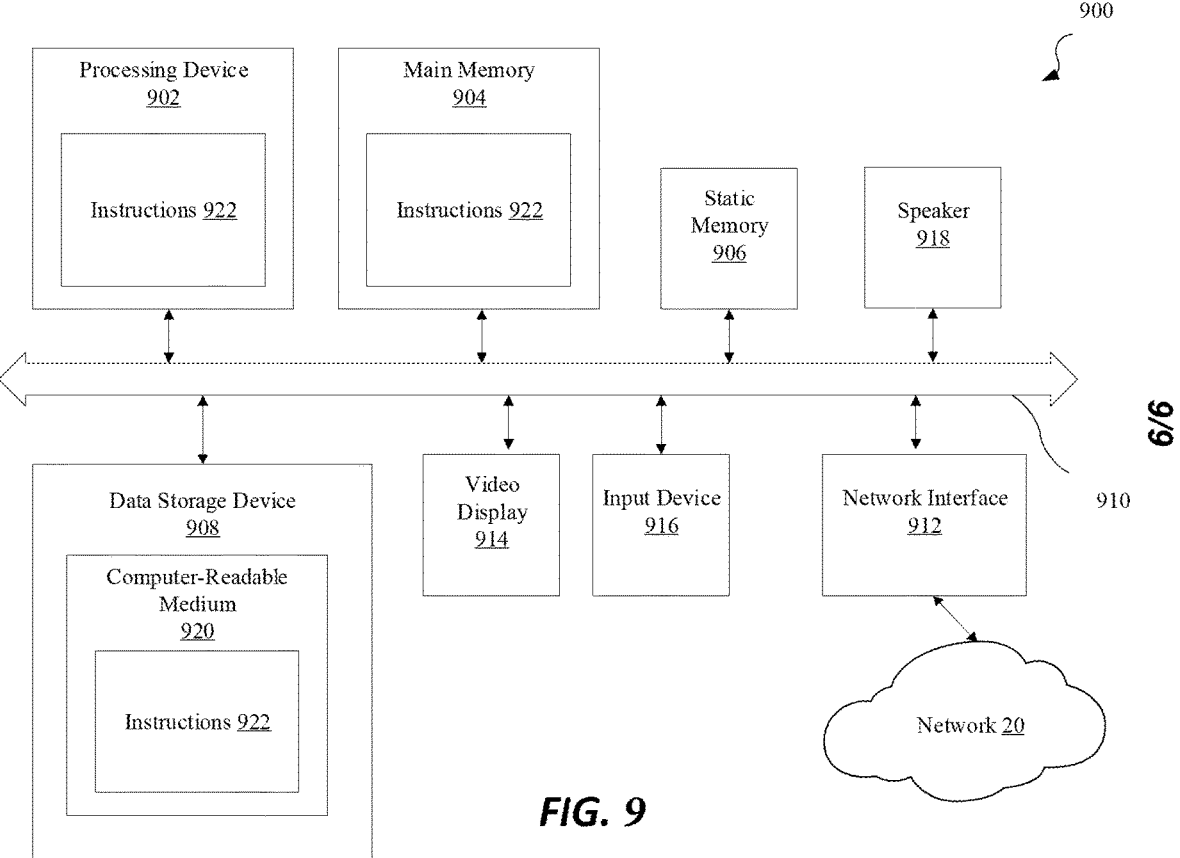
FIG. 9 illustrates an example computer system according to embodiments of this disclosure.

FIG. 9 illustrates an example computer system 900, which can perform any one or more of the methods described herein. In one example, computer system 900 may include one or more components that correspond to the computing device 12, one or more servers 128 of the cloud-based computing system 116, or one or more training engines 152 of the cloud-based computing system 116 of FIG. 1. The computer system 900 may be connected (e.g., networked) to other computer systems in a LAN, an intranet, an extranet, or the Internet. The computer system 900 may operate in the capacity of a server in a client-server network environment. The computer system 900 may be a personal computer (PC), a tablet computer, a laptop, a wearable (e.g., wristband), a set-top box (STB), a personal Digital Assistant (PDA), a smartphone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 900 includes a processing device 902, a main memory 904 (e.g., read-only memory (ROM), solid state drive (SSD), flash memory, dynamic random access memory (DRAM) such as synchronous DRAM (SDRAM)), a static memory 906 (e.g., solid state drive (SSD), flash memory, static random access memory (SRAM)), and a data storage device 908, which communicate with each other via a bus 910.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute instructions for performing any of the operations and steps of any of the methods discussed herein.

The computer system 900 may further include a network interface device 912. The computer system 900 also may include a video display 914 (e.g., a liquid crystal display (LCD) or a cathode ray tube (CRT)), one or more input devices 916 (e.g., a keyboard and/or a mouse), and one or more speakers 918 (e.g., a speaker). In one illustrative example, the video display 914 and the input device(s) 916 may be combined into a single component or device (e.g., an LCD touch screen).

The data storage device 916 may include a computer-readable medium 920 on which the instructions 922 embodying any one or more of the methodologies or functions described herein are stored. The instructions 922 may also reside, completely or at least partially, within the main memory 904 and/or within the processing device 902 during execution thereof by the computer system 900. As such, the main memory 904 and the processing device 902 also constitute computer-readable media. The instructions 922 may further be transmitted or received over a network 20 via the network interface device 912.

While the computer-readable storage medium 920 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

12

CLAUSES

1. A computer-implemented method comprising:
receiving an audio file;
extracting, using an artificial intelligence engine comprising one or more trained machine learning models, one or more audio features from the audio file, wherein the one or more audio features comprise at least one of a time-synchronized transcript, speaker recognition data, mood data, index data, visual asset speaker data, color palette data, and written description speaker data; and
generating, based on the one or more audio features, a video, wherein the video is presented via a media player on a user interface of a computing device.

2. The computer-implemented method of any clause herein, further comprising using the visual asset speaker data to assign one or more visual representations of one or more speakers to be presented when the one or more speakers speak during the video.

3. The computer-implemented method of any clause herein, further comprising causing the time-synchronized transcript to be dynamically presented in conjunction with the one or more visual representations of the one or more speakers during playback of the video.

4. The computer-implemented method of any clause herein, further comprising modifying, based on the mood data, a visual representation of speech of a speaker during playback of the video.

5. The computer-implemented method of any clause herein, further comprising modifying, based on the written description speaker data, presented text in the video during playback of the video.

6. The computer-implemented method of any clause herein, further comprising:
identifying, based on the time-synchronized transcription, an entity associated with a word;
obtaining an image associated with the entity; and
modifying the video to include the image during playback of the video.

7. The computer-implemented method of any clause herein, further comprising:
obtaining written description data of the entity; and
modifying the video to include the written description data of the entity and the image during playback of the video.

8. The computer-implemented method of any clause herein, further comprising:
receiving a selection of the image or the written description data of the entity;
responsive to receiving the selection, causing additional information pertaining to the entity to be presented via the user interface.

9. A tangible, non-transitory computer-readable media storing instructions that, when executed, cause one or more processing devices to:
receive a media file;
extracting, using an artificial intelligence engine comprising one or more trained machine learning models, one or more audio features from the media file, wherein the one or more audio features comprise at least one of a time-synchronized transcript, speaker recognition data, mood data, index data, visual asset speaker data, color palette data, and written description speaker data; and
generating, based on the one or more audio features, a video, wherein the video is presented via a media player on a user interface of a computing device.

10. The computer-readable media of any clause herein, further comprising using the visual asset speaker data to assign one or more visual representations of one or more speakers to be presented when the one or more speakers speak during the video.

11. The computer-readable media of any clause herein, further comprising causing the time-synchronized transcript to be dynamically presented in conjunction with the one or more visual representations of the one or more speakers during playback of the video.

12. The computer-readable media of any clause herein, further comprising modifying, based on the mood data, a visual representation of speech of a speaker during playback of the video.

13. The computer-readable media of any clause herein, further comprising modifying, based on the written description speaker data, presented text in the video during playback of the video.

14. The computer-readable media of any clause herein, further comprising:

identifying, based on the time-synchronized transcription, an entity associated with a word;

obtaining an image associated with the entity; and modifying the video to include the image during playback of the video.

15. The computer-readable media of any clause herein, further comprising:

obtaining written description data of the entity; and modifying the video to include the written description data of the entity and the image during playback of the video.

16. The computer-readable media of any clause herein, further comprising:

receiving a selection of the image or the written description data of the entity;

responsive to receiving the selection, causing additional information pertaining to the entity to be presented via the user interface.

17. A system comprising:

a memory device storing instructions; and a processing device communicatively coupled to the memory device, wherein the processing device executes the instructions to:

receive a media file;

extract, using an artificial intelligence engine comprising one or more trained machine learning models, one or more audio features from the media file, wherein the one or more audio features comprise at least one of a time-synchronized transcript, speaker recognition data, mood data, index data, visual asset speaker data, color palette data, and written description speaker data; and generate, based on the one or more audio features, a video, wherein the video is presented via a media player on a user interface of a computing device.

18. The system of any clause herein, further comprising using the visual asset speaker data to assign one or more visual representations of one or more speakers to be presented when the one or more speakers speak during the video.

19. The system of any clause herein, further comprising causing the time-synchronized transcript to be dynamically presented in conjunction with the one or more visual representations of the one or more speakers during playback of the video.

14

20. The system of any clause herein, further comprising modifying, based on the mood data, a visual representation of speech of a speaker during playback of the video.

The invention claimed is:

1. A computer-implemented method comprising:

receiving an audio file;

extracting, using an artificial intelligence engine comprising one or more trained machine learning models, one or more audio features from the audio file, wherein the one or more audio features comprise at least one of a time-synchronized transcript, speaker recognition data, mood data, visual asset speaker data, color palette data, and written description speaker data, wherein the visual asset speaker data comprises information pertaining to one or more visual representations of one or more speakers associated with the speaker recognition data, and the color palette data comprises information pertaining to the images;

assigning, using the visual asset speaker data, one or more visual representations to one or more speakers identified in the speaker recognition data; and generating, based on the one or more audio features, a video, wherein the video is presented via a media player on a user interface of a computing device, and the video presents the one or more visual representations of the one or more speakers when the one or more speakers speak during the video.

2. The computer-implemented method of claim 1, further comprising causing the time-synchronized transcript to be dynamically presented in conjunction with the one or more visual representations of the one or more speakers during playback of the video.

3. The computer-implemented method of claim 1, further comprising modifying, based on the mood data, a visual representation of speech of a speaker during playback of the video.

4. The computer-implemented method of claim 1, further comprising modifying, based on the written description speaker data, presented text in the video during playback of the video.

5. The computer-implemented method of claim 1, further comprising:

identifying, based on the time-synchronized transcription, an entity associated with a word;

obtaining an image associated with the entity; and modifying the video to include the image during playback of the video.

6. The computer-implemented method of claim 5, further comprising:

obtaining written description data of the entity; and modifying the video to include the written description data of the entity and the image during playback of the video.

7. The computer-implemented method of claim 6, further comprising:

receiving a selection of the image or the written description data of the entity;

responsive to receiving the selection, causing additional information pertaining to the entity to be presented via the user interface.

8. A tangible, non-transitory computer-readable media storing instructions that, when executed, cause one or more processing devices to:

receive an audio file;

extract, using an artificial intelligence engine comprising one or more trained machine learning models, one or more audio features from the audio file, wherein the one or more audio features comprise at least one of a time-synchronized transcript, speaker recognition data, mood data, visual asset speaker data, color palette data, and written description speaker data, wherein the visual asset speaker data comprises information pertaining to one or more visual representations of one or more speakers associated with the speaker recognition data, and the color palette data comprises information pertaining to the images;

assign, using the visual asset speaker data, one or more visual representations to one or more speakers identified in the speaker recognition data; and generate, based on the one or more audio features, a video, wherein the video is presented via a media player on a user interface of a computing device, and the video presents the one or more visual representations of the one or more speakers when the one or more speakers speak during the video.

9. The computer-readable media of claim 8, further comprising causing the time-synchronized transcript to be dynamically presented in conjunction with the one or more visual representations of the one or more speakers during playback of the video.

10. The computer-readable media of claim 8, further comprising modifying, based on the mood data, a visual representation of speech of a speaker during playback of the video.

11. The computer-readable media of claim 8, further comprising modifying, based on the written description speaker data, presented text in the video during playback of the video.

12. The computer-readable media of claim 8, further comprising:

identifying, based on the time-synchronized transcription, an entity associated with a word;

obtaining an image associated with the entity; and modifying the video to include the image during playback of the video.

13. The computer-readable media of claim 12, further comprising:

obtaining written description data of the entity; and modifying the video to include the written description data of the entity and the image during playback of the video.

14. The computer-readable media of claim 13, further comprising:

receiving a selection of the image or the written description data of the entity;

responsive to receiving the selection, causing additional information pertaining to the entity to be presented via the user interface.

15. A system comprising:

a memory device storing instructions; and a processing device communicatively coupled to the memory device, wherein the processing device executes the instructions to:

receive an audio file;

extract, using an artificial intelligence engine comprising one or more trained machine learning models, one or more audio features from the audio file, wherein the one or more audio features comprise at least one of a time-synchronized transcript, speaker recognition data, mood data, visual asset speaker data, color palette data, and written description speaker data, wherein the visual asset speaker data comprises information pertaining to one or more visual representations of one or more speakers associated with the speaker recognition data, and the color palette data comprises information pertaining to the images;

assign, using the visual asset speaker data, one or more visual representations to one or more speakers identified in the speaker recognition data; and generate, based on the one or more audio features, a video, wherein the video is presented via a media player on a user interface of a computing device, and the video presents the one or more visual representations of the one or more speakers when the one or more speakers speak during the video.

16. The system of claim 15, further comprising causing the time-synchronized transcript to be dynamically presented in conjunction with the one or more visual representations of the one or more speakers during playback of the video.

17. The system of claim 15, further comprising modifying, based on the mood data, a visual representation of speech of a speaker during playback of the video.

\* \* \* \* \*